(12) United States Patent
Backhaus

(10) Patent No.: US 7,131,765 B2
(45) Date of Patent: Nov. 7, 2006

(54) HELICAL-RIBBON MIXER

(76) Inventor: Martin Backhaus, Wiesbadener Strasse 4b, Berlin (DE) D-12309

( * ) Notice: Subject to any disclaimer, the term of this patent is extended or adjusted under 35 U.S.C. 154(b) by 177 days.

(21) Appl. No.: 10/746,496

(22) Filed: Dec. 29, 2003

(65) Prior Publication Data

US 2004/0136263 A1 Jul. 15, 2004

(30) Foreign Application Priority Data

Dec. 28, 2002 (DE) ................................ 102 61 335
Apr. 8, 2003 (DE) ................................ 103 16 257

(51) Int. Cl.
*B01F 9/16* (2006.01)

(52) U.S. Cl. ...................... 366/149; 366/291; 366/320; 366/323

(58) Field of Classification Search ................. 366/65, 366/291, 310, 320, 149, 323
See application file for complete search history.

(56) References Cited

U.S. PATENT DOCUMENTS

| | | | | |
|---|---|---|---|---|
| 1,422,102 A | * | 7/1922 | Hutchinson | 426/622 |
| 1,713,886 A | * | 5/1929 | Benzon | 222/149 |
| 1,734,632 A | * | 11/1929 | Merrill | 162/59 |
| 2,247,439 A | * | 7/1941 | Hawes | 366/343 |
| 2,679,982 A | * | 6/1954 | Thyle | 241/46.17 |
| 5,299,865 A | * | 4/1994 | Presnell | 366/300 |
| 5,382,092 A | * | 1/1995 | Okamoto et al. | 366/320 |
| 2001/0019515 A1 | * | 9/2001 | Schmidt et al. | 366/310 |

* cited by examiner

*Primary Examiner*—David Sorkin
(74) *Attorney, Agent, or Firm*—Browdy and Neimark, PLLC

(57) ABSTRACT

A helical-ribbon mixer having a rotation-symmetrical inner mixing vessel wall (2), a motor-driven central agitator axis (3) therein, on which, on lateral agitator arms (5), at least one helical ribbon (4) is held close to the vessel wall downwardly sloping with a circular slope (SZ) in a direction of rotation (D), wherein the helical ribbon (4), vectorially combined circularly and radially, has a helical ribbon angle of slope (SN) relative to the horizontal that is greater than a gliding angle (G) on the helical ribbon (4) of a material (M) to be mixed.

18 Claims, 11 Drawing Sheets

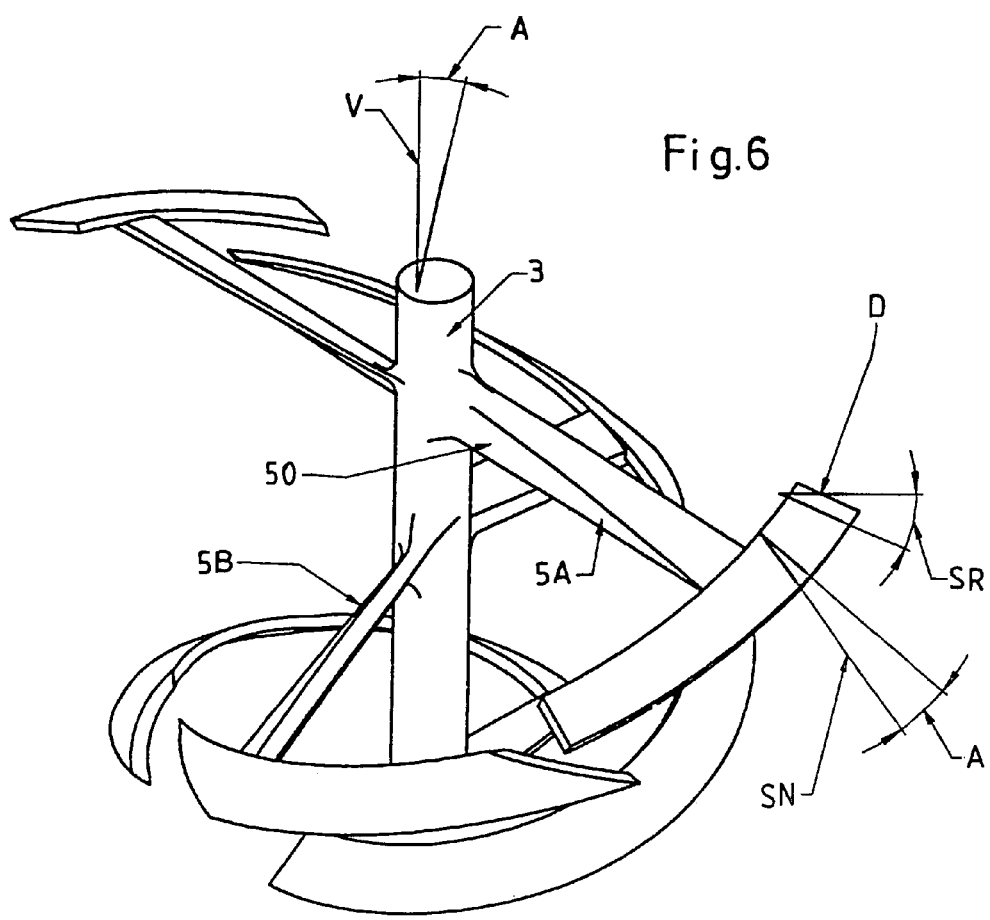

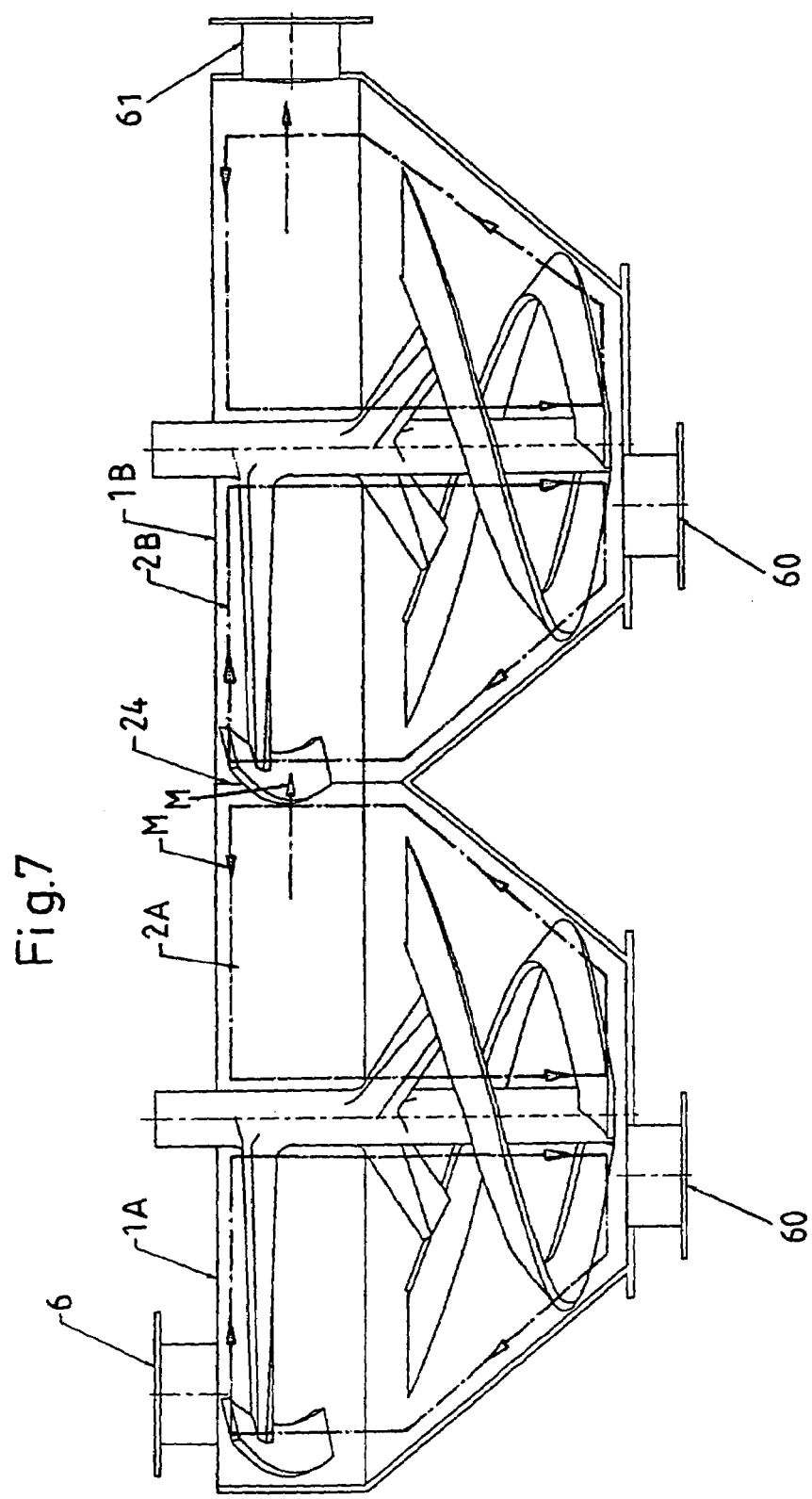

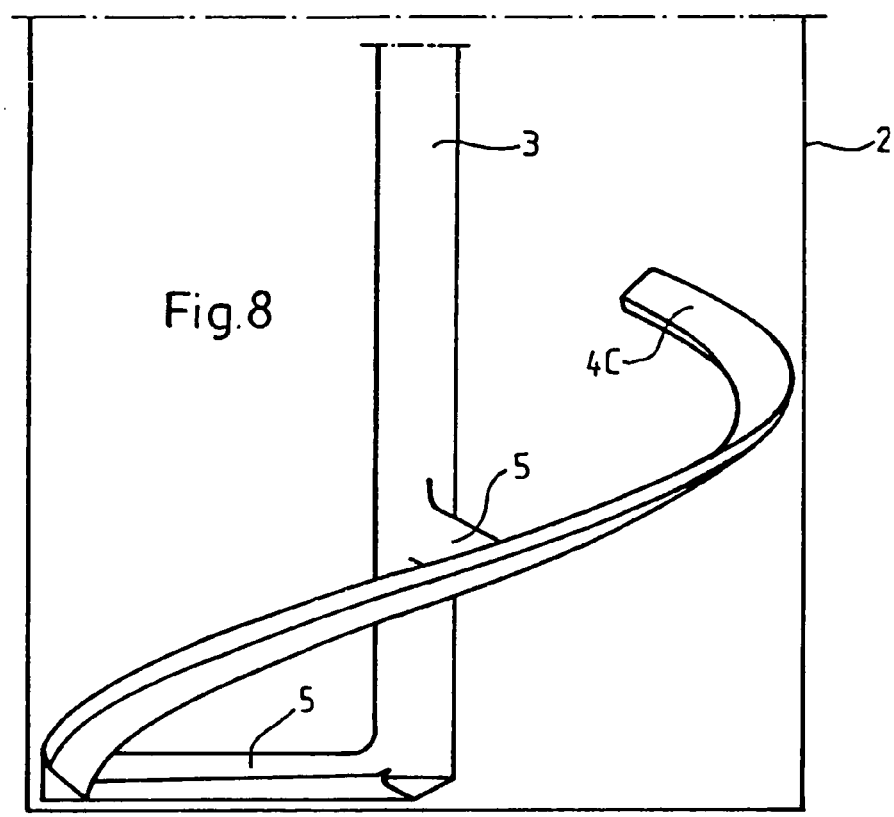
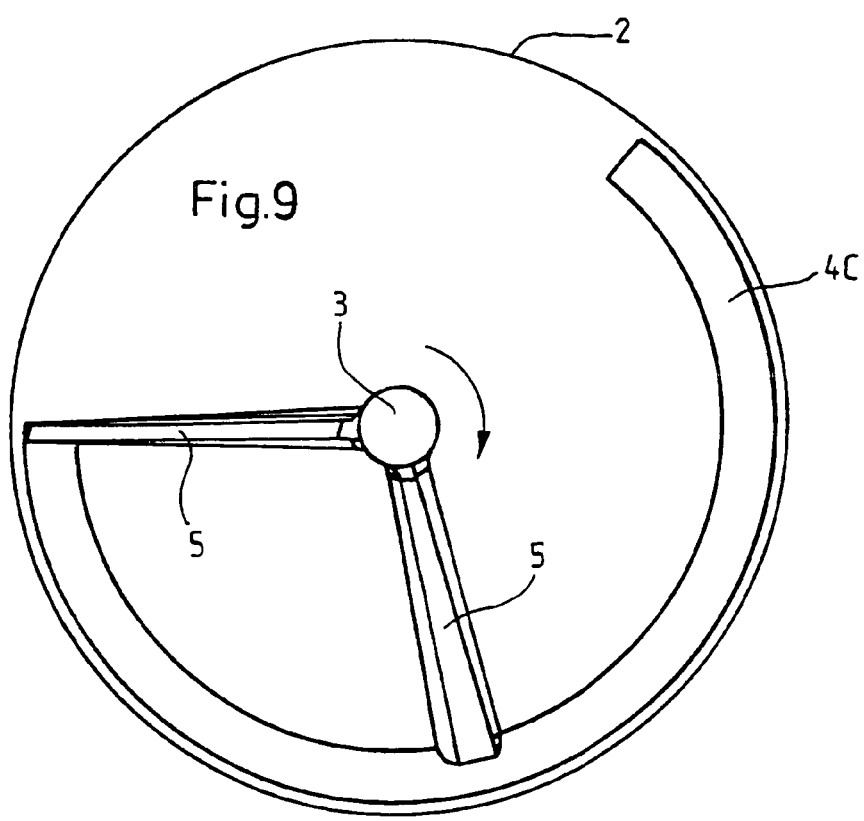

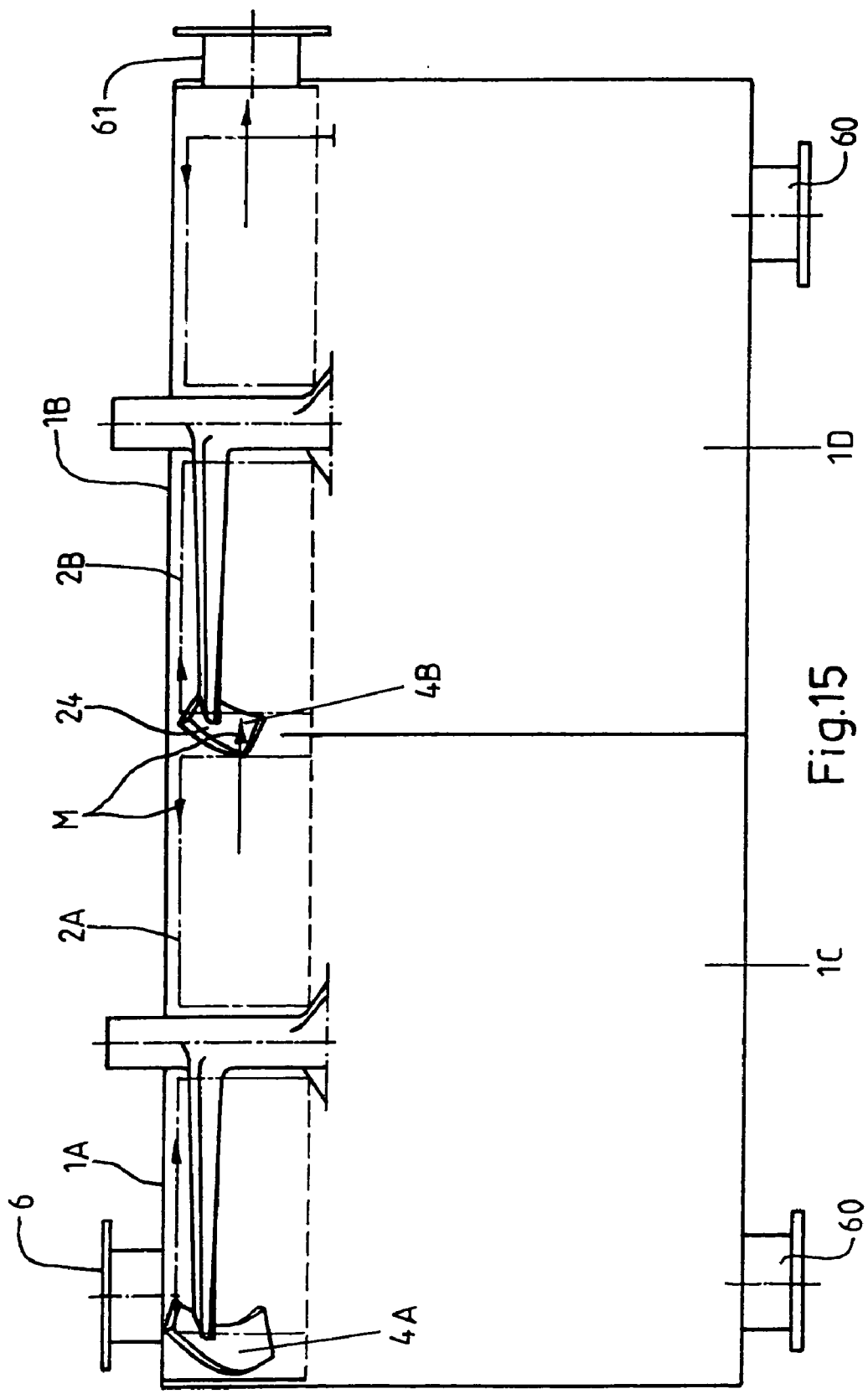

HELICAL-RIBBON MIXER

BACKGROUND OF THE INVENTION

1. Technical Field of the Invention

The present invention is concerned with a helical-ribbon mixer having a rotation-symmetrical inner mixing vessel wall, a motor-driven central agitator axis therein, on which, on lateral agitator arms, at least one helical ribbon is held close to the vessel wall, downwardly sloping with a circular slope in a direction of rotation.

2. Prior Art

A helical-ribbon mixer of this type is known from DE 195 47 220 C2. The helical ribbon serves to convey the material to be mixed in an upward flow near the wall, whereupon it flows back in a downflow near the axis and intermixes in the process. One problem associated with these mixers is emptying them as residue-free as possible, for which purpose the agitator arm that holds the helical ribbon at its lower end is designed with a special shape, so that it clears the vessel bottom while placing little stress on the material to be mixed. The helical ribbon is oriented radially relative to the central agitator axis and designed in a circular helical shape with the helix pitch preferably being relatively small near the bottom and increasingly larger from there, to allow for the initial acceleration of the material to be mixed. However, the slope of the helix surface relative to the horizontal is altogether less than the gliding angle so that the material to be mixed does not completely run off it during idling, so that additional measures must be taken to free the helix surface from the material to be mixed when a complete change of the mixing batch is to take place. Furthermore, the radially flat orientation of the helix surface has the shortcoming that it must be designed narrow relative to the mixer radius, as the screw helix, in the case of a cylindrical vessel chamber, will otherwise only rotate a hollow-cylindrical portion of the material in the mixer in a circular motion, with relatively stable separating borders forming in this rotating region and no up and down flows resulting. The essential precondition for the upward conveyance is the presence of a friction with a circular action whereby the material to be mixed is imparted with a lifting force component by the upwardly sloped helix surface, which, however, especially in the case of wider screw helixes, which are gentle on the material, and a relatively wide gap between the helix and the mixer wall, which also has a gentle effect, is only moderately developed.

Furthermore, a mixing apparatus is known from EP 1 123 731 A2, the housing of which conically widens from the bottom up at a cone angle of 60–120 degrees and subsequently transitions into a vertical cylinder space. A flat screw helix is located at the lower outlet and disposed adjoining same close to the wall are flat, strip-shaped mixer blades, which are elliptical on their outside, which may be pitched between 15 degrees and 60 degrees relative to the horizontal. These mixer blades produce a pronounced material displacement toward the center and a minor upward flow since the upper side of the blades is in each case sloped at an obtuse angle to the vessel wall and only a low pushing resistance is offered to the material to be mixed, which is required for a lifting force. Furthermore, no self-emptying takes place at the flat helix surface and with the flat mixer blade pitch. Also, at cone angles above 90° the housing is not self-emptying.

OBJECT AND SUMMARY OF THE INVENTION

It is the object of the invention to improve the above-described helical-ribbon mixer with respect to its mixing performance and self-emptying properties.

This object is met with the helical ribbon having a helical ribbon angle of slope relative to the horizontal, vectorially combined circularly and radially, that is larger than a gliding angle on the helical ribbon of a material to be mixed.

To attain self-emptying, the surface of the helical ribbon is sloped to such a degree that the material to be mixed slides off it. The inner vessel surface is preferably designed with the same degree of steepness and the surface of the agitator arms steeper than the gliding angle.

If the agitator axis and/or mixing vessel axis is/are permanently or appropriately adjustably sloped toward the vertical, the angle of slope of the axis is added vectorially to the angle of slope of the helical ribbon toward the radial plane, as each region of the helical ribbon has one position per revolution in which this combined slope occurs. If it is greater than the gliding angle, the material to be mixed slides off there.

The agitator arms on which the helical ribbon, or its sections if it is subdivided into sections, is held, also are provided with surfaces that are sloped such that their slope relative to the horizontal is greater than the gliding angle.

The slope of the agitator arm preferably has a component in its region near the axis that ascends in the direction of rotation in order to support a descending force there.

The circular slope of the helical ribbon is preferably between 5° and 30°, preferably 20°.

At the lower end, an increase in the circular slope of the helical ribbon is advantageously provided to attain an acceleration from the bottom up. Additionally, a small clearance and a helical web shape of the clearing arm are provided at the bottom, with the latter providing for an emptying process with little stress on the material to be mixed.

In the case of mixing chambers with an upwardly increasing cross section, the helical ribbon is advantageously adapted also in its width to the radius of the space, so that it is always approximately 10% to 20% of the given mixing chamber radius.

The mixer can be used as a batch mixer and, for this purpose, has a filler neck at its top and a controllably closeable outlet at its bottom.

In a continually operating mixing apparatus, a plurality of mixing vessels are preferably connected in series, with the upper regions being in communication with one another in such a way that the walls are left open there. The mixing regions of the adjoining rotors advantageously even overlap to some degree.

To support a flow of the material to be mixed from mixer to mixer, the material that is conveyed laterally outward by the first helical ribbon due to its slope, is received better by the second mixer if no helical ribbon is placed at this height, or if it is sloped radially conveying inward in that region.

The wall clearance of the helical ribbon that is sloped toward the wall may advantageously be selected greater than in the case of radially oriented helical ribbons since a sufficient frictional resistance force is nonetheless created at the wall. In the wider wall gap the material is treated more gently and an additional flow is created around the helical ribbon, which improves the mixing result and saves mixing time and rotor energy.

The above-described versions solve the known problems with a combined slope of the helical ribbon that is sufficient in a radial and circular direction for the threshold sliding angle of the material to be exceeded. One variant that was studied more closely is that the helical ribbon is designed sloped toward the vessel wall to increase the friction component that is required to lift the material to be mixed. However, with sensitive materials to be mixed, this results in a strong crushing at the wall and with doughy materials the kneading is impeded. Also, overcoming the wall friction requires additional drive energy. In a further embodiment, the helical-ribbon mixer is prepared for the mixing and/or kneading-mixing of sensitive products with reduced drive power in such a way that the helical ribbon is radially sloped upward toward the mixing vessel walls at least where the adjacent mixing vessel wall extends divergently or vertically upright.

The slope of the helical ribbon, in this additional embodiment, is oriented toward the center of the mixing vessel. This results in a friction of the material that is located on the helical ribbon toward the adjoining downward flowing material so that the circular forward force of the helix creates a lifting force of the material on the helix. However, a portion of the material to be mixed is also pushed off laterally into the centrical downward flow, so that smaller partial flows occur in the entire circulation, which produce an added local intermixing.

These partial flows are further enhanced when the width of the screw helix increases or decreases with an increasing height, so that the partial flows are formed cascade-like offset in the radial direction, i.e., a good cross-intermixing is attained.

The helical ribbon is advantageously provided at its lower edge facing the center of the vessel with a steeply downward pointing screw web, which prevents the flow from entering underneath the helical ribbon.

It is furthermore advantageous to design the helical ribbon on its side face closest to the wall downwardly divergent from the wall, which further reduces the edge friction and a crushing of the material to be mixed.

The radially sloped design of the screw helix has proven useful with wall-heated mixers as the time of direct contact of the material to be mixed with the wall is only short in each case until it is replaced by the following material, which results in an acceleration of the heat distribution toward the center of the mixer as compared to previously known mixers and is more homogenous, and there also is no overheating and caking of the material to the wall. The inwardly sloped shape of the helical ribbon has proven useful for preparing a paste and kneading doughy material, with the direction of operation of the helical ribbon drive being changed during the operating phases.

BRIEF DESCRIPTION OF THE DRAWINGS

FIG. 6 shows a perspective for FIG. 3;
FIG. 7 shows a linking of two mixing vessels;
FIG. 8 shows a side view of an agitator arm of a second type;
FIG. 9 shows a top view of an agitator arm of a second type;
FIG. 15 shows a double mixer.

DETAILED DESCRIPTION OF THE PREFERRED EMBODIMENTS OF THE INVENTION

Figure 1:
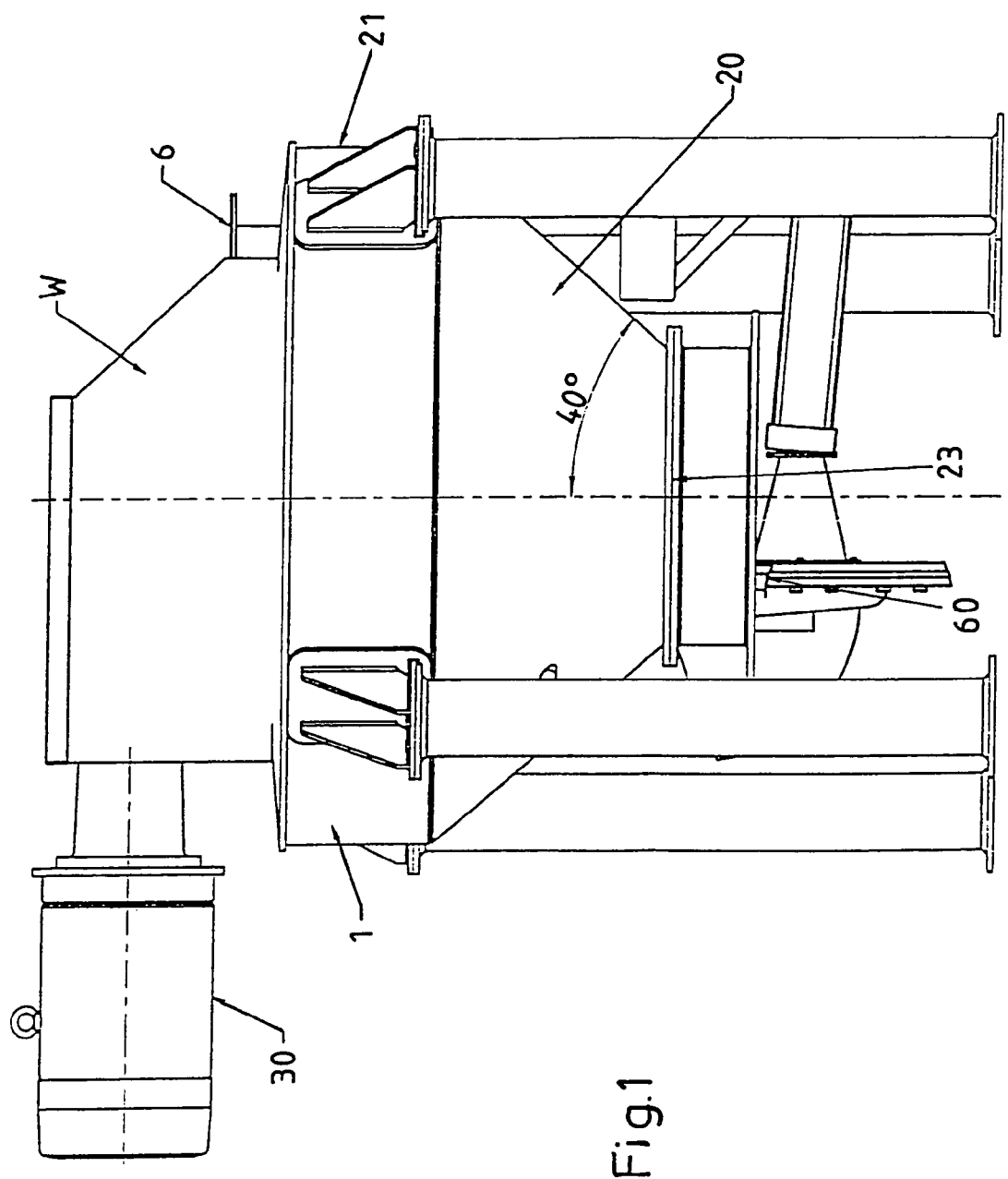
FIG. 1 shows a side view of a mixing vessel.

FIG. 1 shows a side view of a mixing vessel 1 having a filler neck 6 on top and a controllably closeable outlet 60 in the bottom region 23. The mixing vessel 1 incorporates mixing vessel sections 20, 21, 22, a cone section 20 of which, which diverges under approximately 80°, transitions into a cylindrical section 21 on top. On a lid, an agitator drive 30 is disposed with a motor and an angle drive W, which drives the agitator shaft, which is located centrically in the mixing vessel 1.

Figure 2:
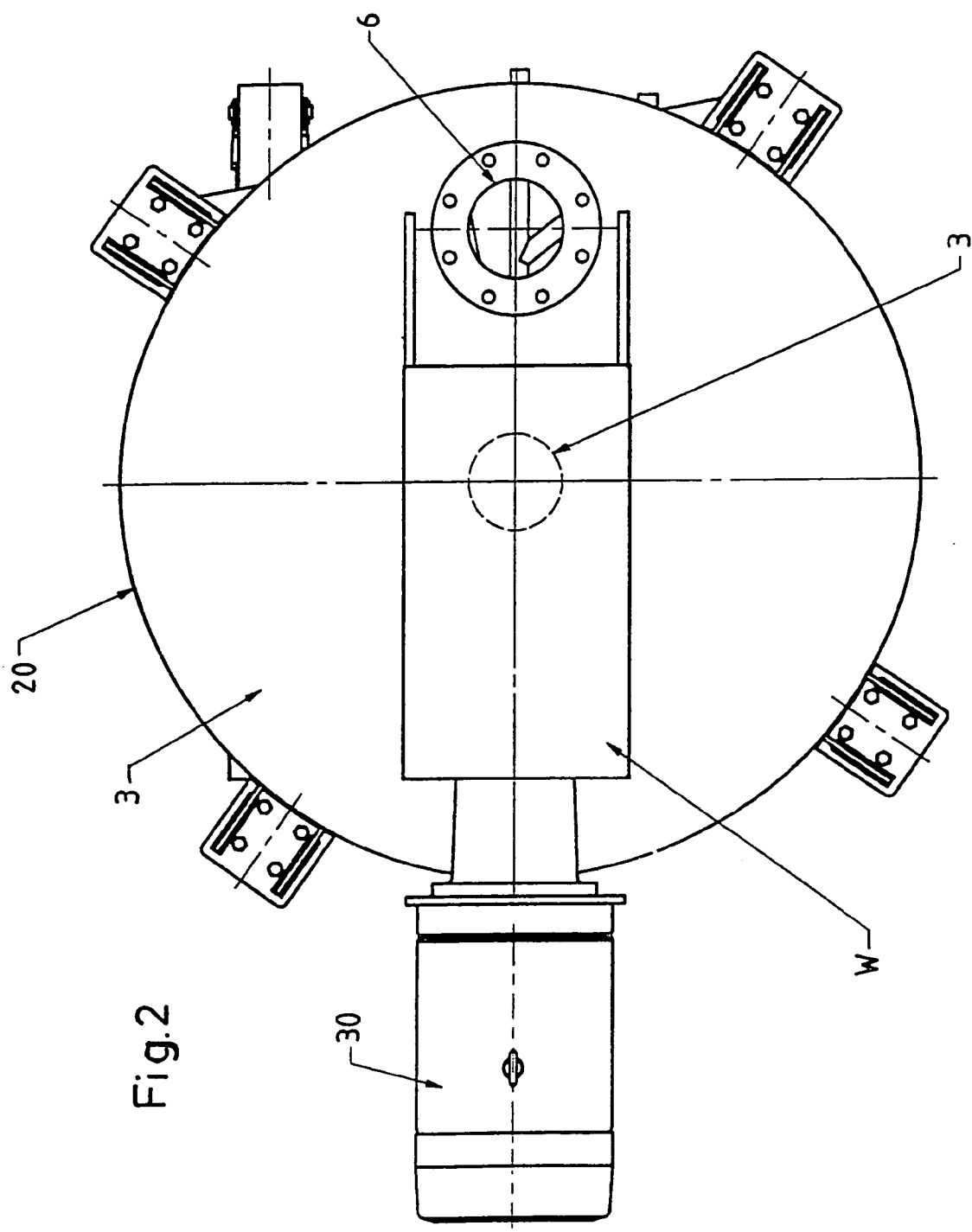
FIG. 2 shows a top view for FIG. 1.

FIG. 2 clarifies, in the top view, the rotation-symmetrical design of the mixer and placement of the drive 30 with the gearing W and filler neck 6.

Figure 3:
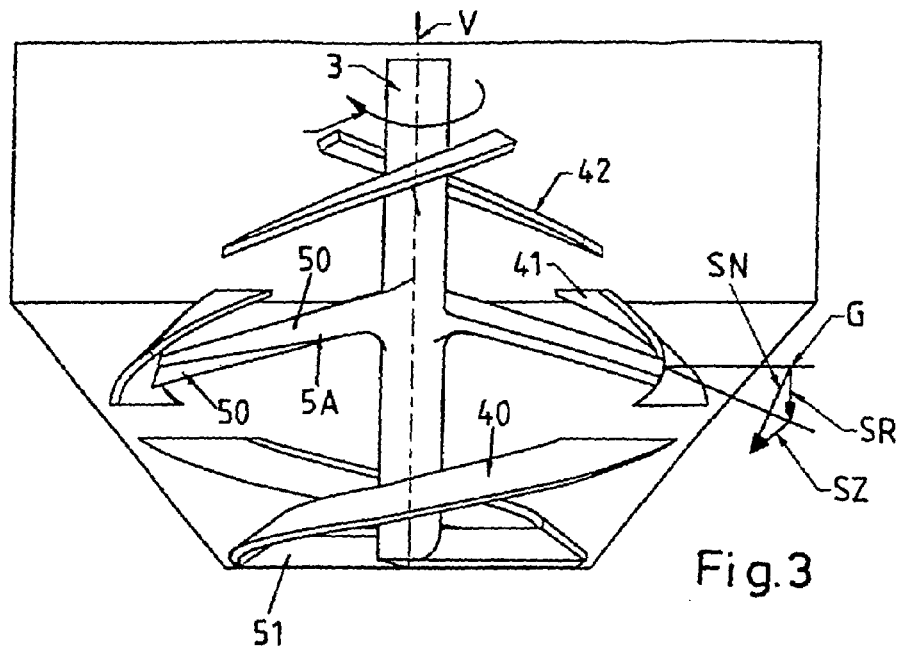
FIG. 3 shows a side view of a mixer.
Figure 4:
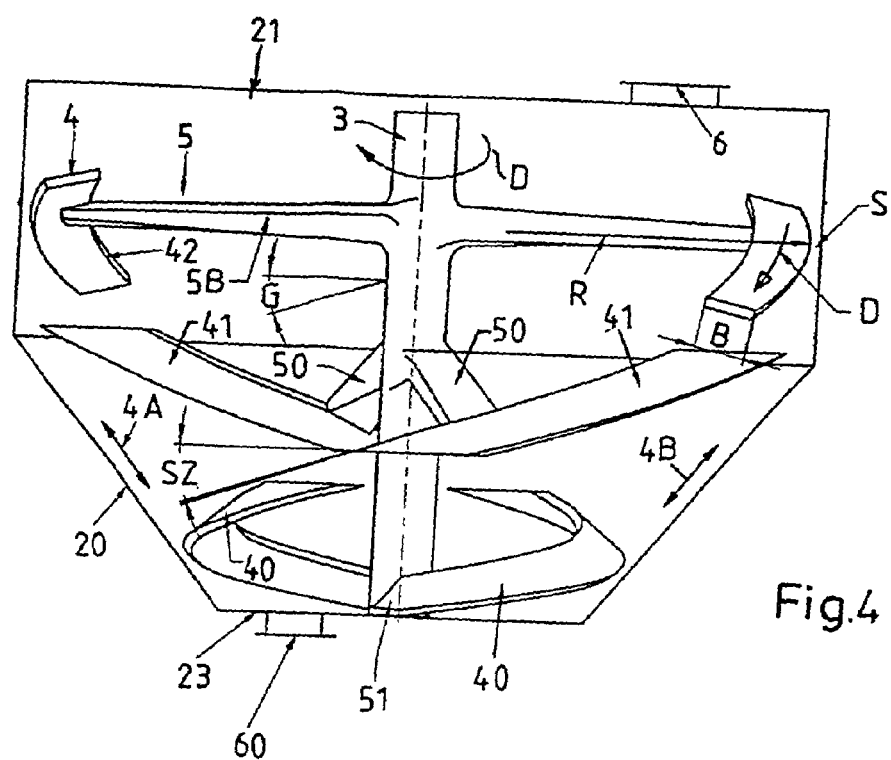
FIG. 4 shows a second side view, rotated 90° from FIG. 3.
Figure 5:
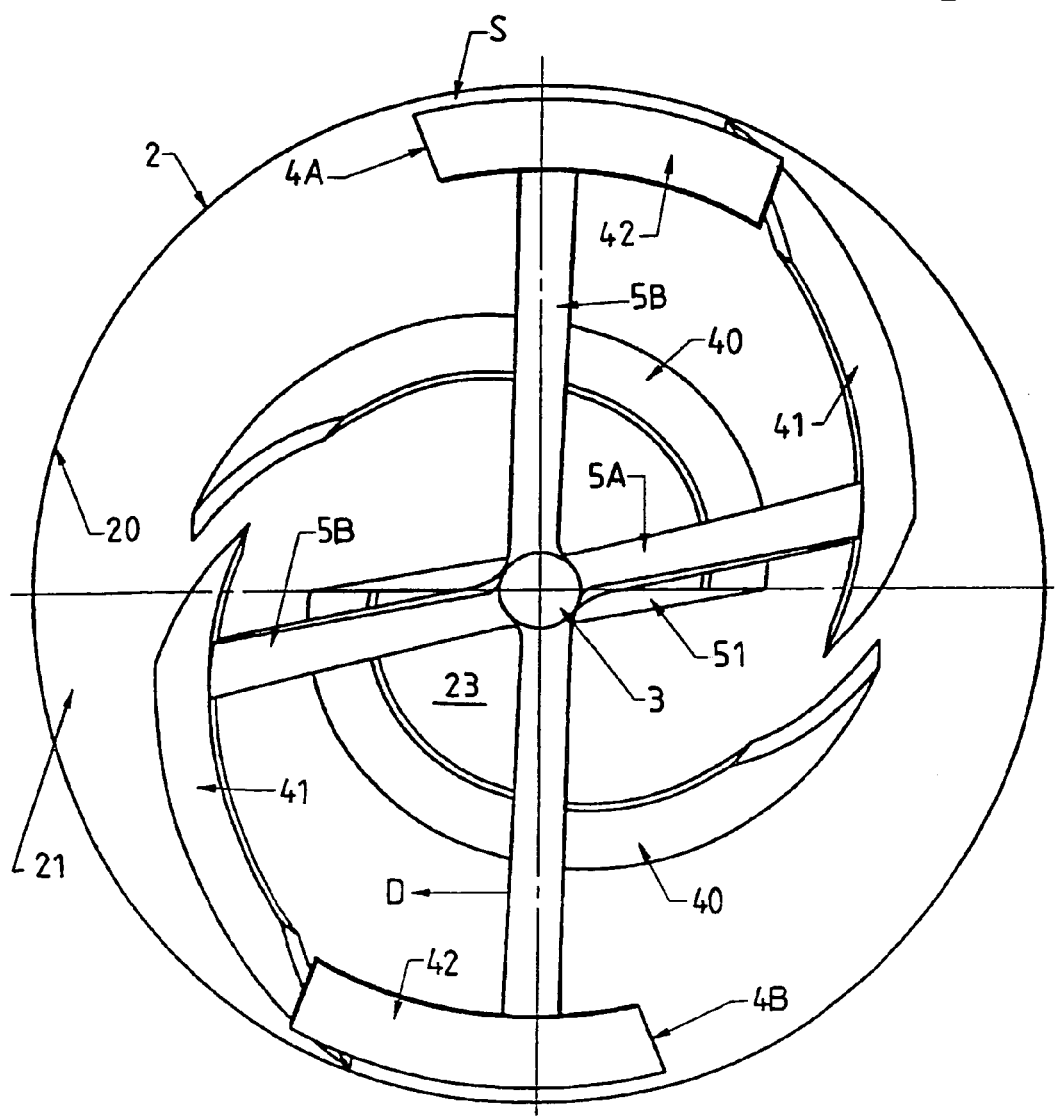
FIG. 5 shows a top view for FIG. 3.

FIGS. 3 and 4 show a side view and FIG. 5 shows a top view of the mixer, which consists of a vertical agitator shaft 3 with agitator arms 5 and two helical ribbons 4A, 4B, which are located radially outside with a small lateral clearance S to the mixing vessel wall 2, of which only the inner contour is shown in the axial section. From the approximately flat bottom region 23, the lower wall section 20 extends upward, expanding in a hollow, tapered shape until it reaches the cylinder section 21.

The mixer in this example has two helical ribbons 4 that are offset by 180°, each of which is divided into two helical ribbon sections 40–42, which are disposed vertically above one another, spaced apart by approximately the width B of a helical ribbon.

The helical ribbon width B corresponds to approximately 10%–20% of the helical ribbon radius R, depending on whether the view is from the top or bottom.

The agitator arms 5, 5A, 5B have on their surface 50 a steep slope, which is greater than the gliding angle G, so that the material to be mixed slides off and does not stick during the emptying process. The slope of the arm surface 50 is designed rising near the axis in the direction of rotation D, i.e., downwardly conveying, and designed falling at its side away from the axis, i.e., upwardly conveying, like the helical ribbon.

At the bottom, a clearing arm 51 is led near the bottom from each helical ribbon section 40 toward the agitator shaft 3. The helical ribbon section 40, which is closest to the bottom, incorporates, as shown in FIG. 4, an increasing circular slope SZ in the direction of rotation D, which is shown in its continuation to SZ=20°.

Additionally, the helical ribbon 4 has a radial slope SR that is sloped toward the mixer wall 2, as shown by the tangent in FIG. 1. This radial slope SR may be 40°, for example. The vectorial summation of the two slopes SZ and SR produces the helical ribbon angle of slope SN relative to the horizontal of over 45°, which is thus greater than the gliding angle G of the material to be mixed relative to a steel ribbon surface.

FIG. 6 shows in the perspective a variant of the mixer arrangement wherein the agitator axis 3 is sloped by an axis angle of slope A of approximately 15° relative to the vertical V. In this case the angle of slope A is added to the radial angle of slope SR in each case on the downwardly sloped side in the plane of slope. The former can thus also be added vectorially to the helical ribbon angle of slope SN and the comparison to the gliding angle can be viewed as a whole, as it must remain lower for emptying purposes.

FIG. 7 shows two mixing vessels 1A, 1B in a schematic side view, which slightly overlap in the upper region. The walls 2A, 2B have been left open there so that a communicating region 24 is created, through which the material M to be mixed passes, since the radial slope of the helical ribbons 4A of the one mixer 1A are sloped outward and the helical ribbons 4B of the other mixer 1B are shown ending below the communicating region 24. The material M to be mixed thus flows, as marked in dot-and-dash lines, up near the wall on one hand in each case, and centrally down, as well as from the first vessel 1A, which carries the filler neck 6, to the second vessel 1B, and from there to an upper outlet 61 if the operation is continuous. Emptying, however, takes place via the lower outlets.

FIG. 8 shows a side view of FIG. 9, from which it is apparent that the mixing vessel wall 2 is cylindrical, i.e., not as shown in the example in FIG. 1. The agitator axis 3 and the vessel axis are shown coaxial and vertical. However, a slope from the vertical is possible as well.

FIG. 9 shows a helical ribbon mixing apparatus 4C, which is held with two agitator arms 5 on an agitator axis 3. The mixing vessel wall 2 has a small clearance from the helical ribbon 4.

Figure 10:
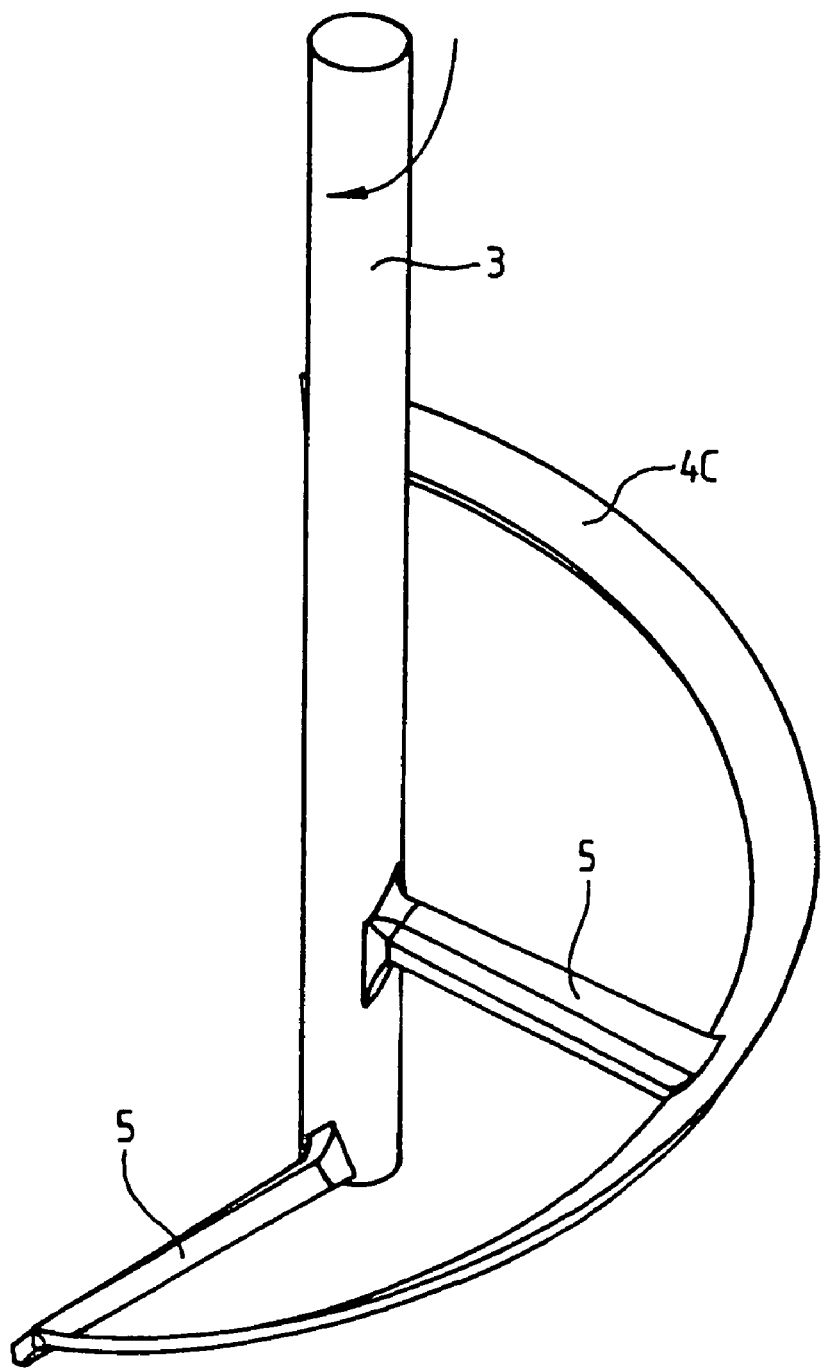
FIG. 10 shows a perspective for FIG. 8.

FIG. 10 shows a perspective of FIGS. 8 and 9 without the vessel wall.

Figure 11:
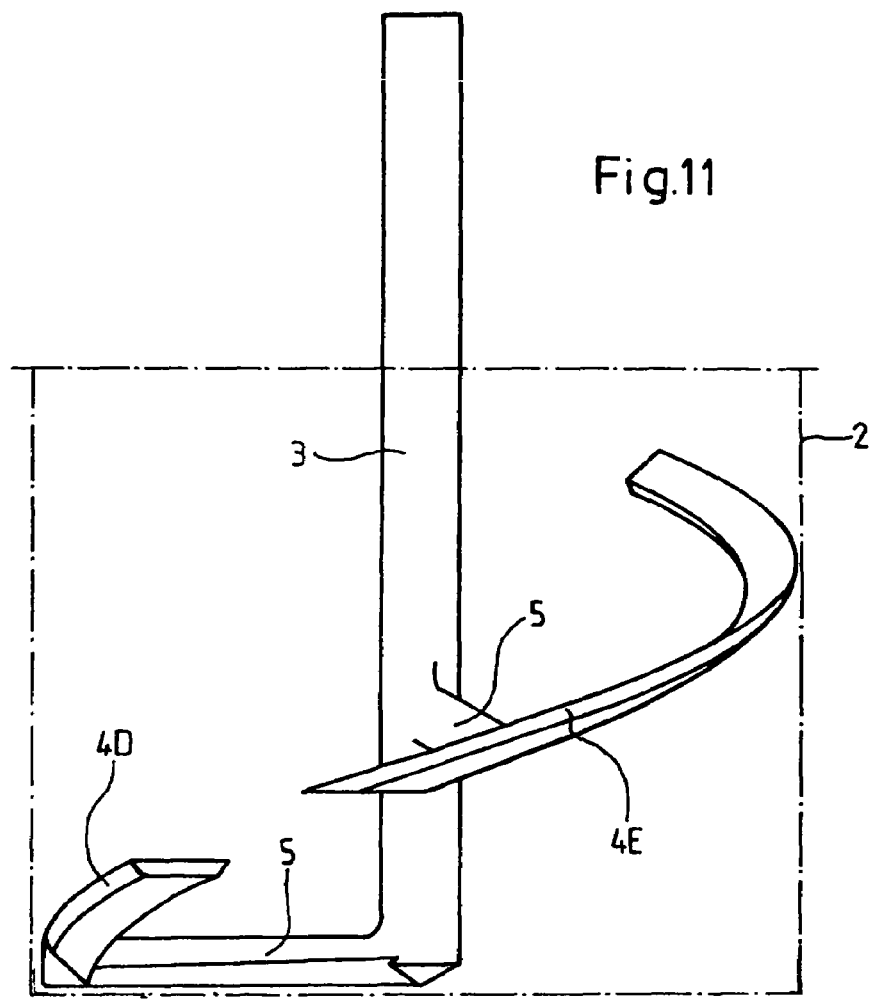
FIG. 11 shows a side view of an agitator arm incorporating a gap.

FIG. 11 shows a plan view of a helical ribbon 4E, the width B, B1 of which increases along its path. The helical ribbon has a gap, so that static or dynamic tools can be inserted into the mixing region from the vessel wall 2.

Figure 12:
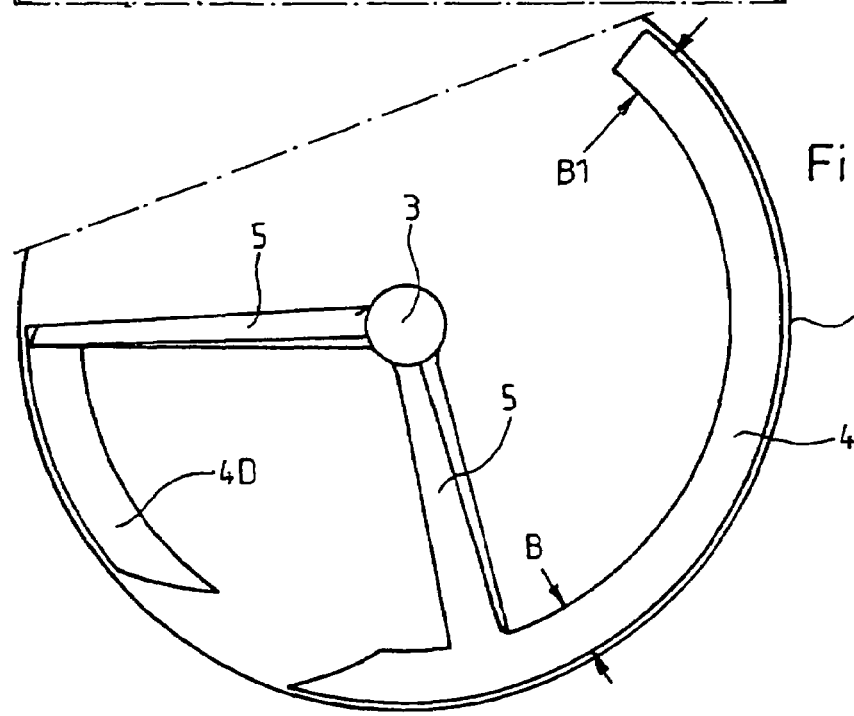
FIG. 12 shows a top view for FIG. 11.

FIG. 12 shows a side elevation of FIG. 11.

Figure 13:
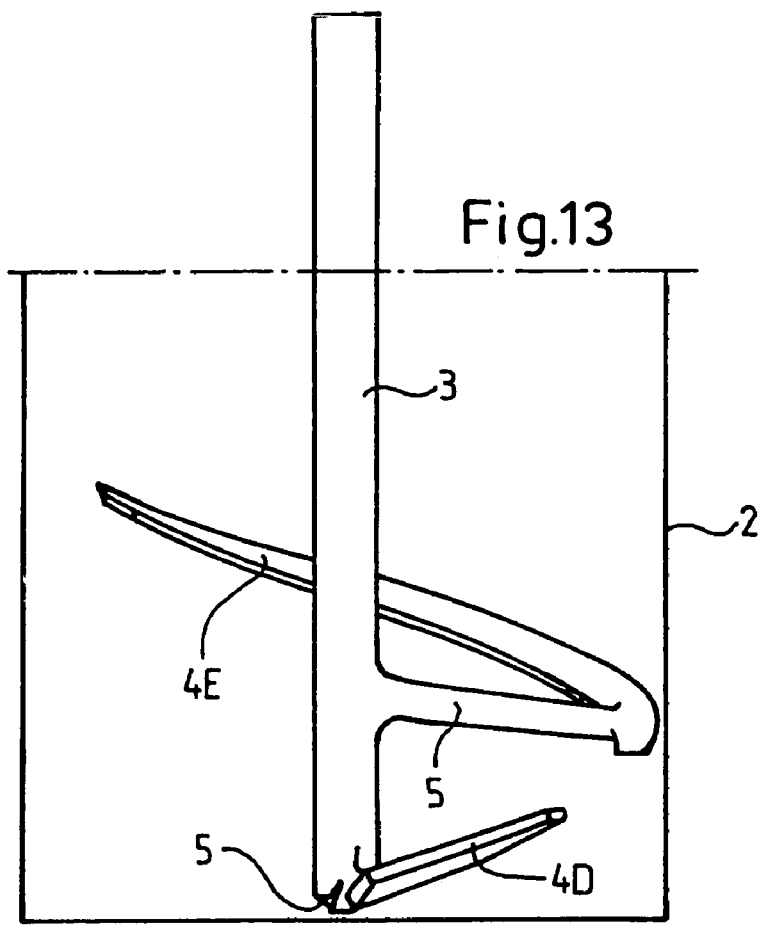
FIG. 13 shows a rotated side view for FIG. 11.

FIG. 13 shows an additional side elevation of the screw helix from FIG. 11, which is rotated back by 90°. The lower helix section 4D incorporates a lesser circular pitch than the higher helix section 4E.

Figure 14:
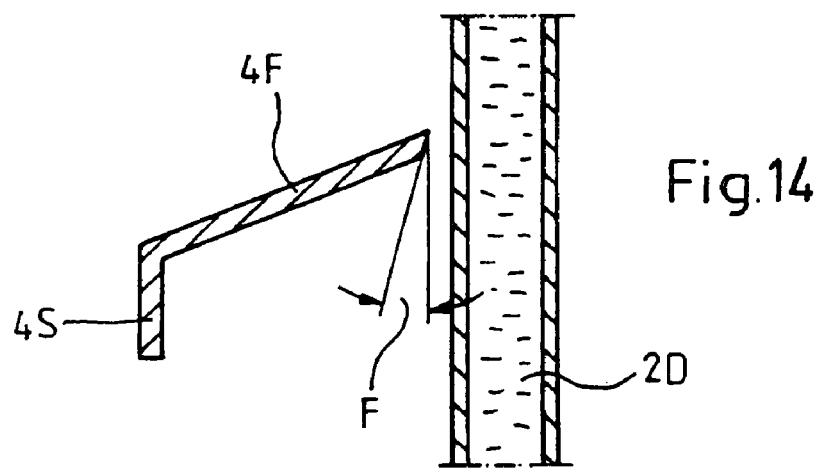
FIG. 14 shows a radial cross section of a helical ribbon.

FIG. 14 shows a section of the helical ribbon 4F in a preferred embodiment in the cross section. The downward slant of the active surface of the screw helix 4F away from the mixing vessel wall 2D is apparent.

At the lower edge of the helix 4F, a helical ribbon web 4S is attached or formed integrally steeply downward. It hinders the material to be mixed from flowing underneath the helix 4F, 4S.

At its surface closest to the wall, the helical ribbon is slanted downwardly divergent from the wall 2D so that the material friction is very low in this region.

The wall 2D of the mixing vessel is shown as a double wall. A heating or cooling medium flows through it. The downward slope of the helical ribbon, which is oriented toward the interior of the vessel, results in a relatively short contact of the material to be mixed with the wall and a quick homogenous temperature distribution when the mixer is in operation.

The fast, complete emptying of the mixer, which is attained by the radial slope of the screw helix, eliminates the need for a high-speed rotation of the mixing apparatus, which is not permitted when mixing potentially explosive goods, e.g., organic powders, such as flour. The downward slope of the helixes away from the vessel wall prevents a strong friction at the wall of the material to be mixed, which averts the danger of a local overheating or dangerous sparking.

FIG. 15 shows two mixing vessels 1C, 1D in a schematic side view, which slightly overlap in the upper region. The walls 2A, 2B have been left open there so that a communicating region 24 is created, through which the material M to be mixed passes since the radial slope of the helical ribbons 4A of the one mixer 1A are sloped outward and the helical ribbons 4B of the other mixer 1B are shown ending below the communicating region 24. The material M to be mixed thus flows, as marked in dot-and-dash lines, up near the wall on one hand in each case, and centrally down, as well as from the first vessel 1A, which carries the filler neck 6, to the second vessel 1B, and from there to an upper outlet 61 if the operation is continuous. Emptying, however, takes place via the lower outlets.

LIST OF REFERENCE NUMERALS

1 Mixer
1A, 1C First Mixing Vessel
1B, 1D Second Mixing Vessel
2 Mixing Vessel Wall
2A, 2B, 2D Mixer Walls
20 Lower Cone Wall Section
21 Cylinder Section
22 Mixing Vessel Sections
23 Bottom Region
24 Communicating Region
3 Agitator Axis
30 Agitator Drive
4 Helical Ribbon
4A, 4B Helical Ribbon
4C Helical-Ribbon Mixing Apparatus
4D Lower Helix Section
4E Higher Helix Section
4F Helical Ribbon
4S Helical-Ribbon Web
40 First Helical Ribbon Section
41 Second Helical Ribbon Section
42 Third Helical Ribbon Section
5 Agitator Arms
5A, 5B Agitator Arms
50 Agitator Arm Surface
51 Clearing Arm
6 Filler Neck
60 Outlet
61 Upper Outlet
A Agitator Axis Slope Relative to the Vertical
B, B1 Width of the Helical Ribbon
D Direction of Rotation
G Gliding Angle
M Material to be Mixed
R Helical Ribbon Radius
S Lateral Clearance of the Helical Ribbon
SN Angle of Slope of the Helical Ribbon
SR Radial Slope of the Helical Ribbon
SZ Circular Slope of the Helical Ribbon
V Vertical
W Angular Gear

What is claimed is:

1. A helical-ribbon mixer having a rotation-symmetrical inner mixing vessel wall (2), a motor-driven central agitator shaft (3) therein, on which, on lateral agitator arms (5), at least one helical ribbon (4) is held close to the vessel wall downwardly sloping with a circular slope (SZ) in a direction of rotation (D), characterized in that the helical ribbon (4), vectorially combined circularly and radially, has a helical ribbon angle of slope (SN) relative to the horizontal that is greater than a gliding angle (G) on the helical ribbon (4) of a material (M) to be mixed;

wherein the mixing vessel wall has a first cylinder section (21) and a second conical section (20) engaged together with a flat bottom region (23) near an outlet of the mixer, the mixing vessel wall having a steeper slope than that of the gliding angle (G), wherein the helical ribbon (4) is sloped radially downward toward the mixing vessel wall (20, 21) at least where the mixing vessel wall (20, 21) extends divergently or vertically upward;

wherein the helical ribbon (4) has a helical ribbon width (B) between 10% and 20% of a helical ribbon radius (R) at that location;

wherein the helical ribbon (4) has a lateral clearance (S) to the mixing vessel wall (2) and is radially sloped toward the same such that, when driven, it conveys the material (M) to be mixed partly outward further up and inwardly circulating at the bottom, and partly upward, and wherein the helical ribbon (4F) incorporates on its side closest to the wall a downwardly divergent clearance angle (F).

2. A helical-ribbon mixer according to claim 1, characterized in that the agitator shaft (3) and the axis of the mixing vessel wall (2) incorporate an axis angle of slope (A) against the vertical (V), that the same vectorially together with the helical ribbon angle of slope (SN) is greater than the gliding angle (G) so that each helical ribbon section during one rotation of the agitator shaft in each case is temporarily sloped more toward the horizontal plane than the gliding angle (G).

3. A helical-ribbon mixer according to claim 1, characterized in that the helical ribbon (4) or helical ribbon sections (40, 41, 42) of the same are held on the agitator shaft (3) by the agitator arms (5), each of which incorporates a surface (50) that is designed in such a way that during one rotation of the agitator shaft it is in each case temporarily sloped more toward the horizontal than the gliding angle (G).

4. A helical-ribbon mixer according to claim 3, characterized in that the surfaces (50) of one or more agitator arms (5) are designed at least in their region closest to the axis sloped circularly ascending in the direction of rotation (D) in such a way that the material to be mixed (G) is conveyed downward in that region.

5. A helical-ribbon mixer according to claim 1, characterized in that it contains two helical ribbons (4A, 4B) that are circularly offset by 180° and these are in each case divided into helical ribbon sections (40, 41, 42), which are disposed in each case offset from one another toward the agitator shaft by approximately one width (B) of a helical ribbon.

6. A helical-ribbon mixer according to claim 1, characterized in that the circular slope (SZ) of the helical ribbon (4) is between 5 degrees and 30 degrees.

7. A helical-ribbon mixer according to claim 6, characterized in that the helical ribbon (40), as its height increases, has an increasing circular slope (SZ).

8. A helical-ribbon mixer according to claim 6, characterized in that the circular slope (SZ) of the helical ribbon (40) increases in the mixer bottom region (23) against the direction of rotation (D) to approximately 20 degrees and is otherwise approximately 20 degrees.

9. A helical-ribbon mixer according to claim 1, characterized in that the helical ribbon (4E), as its height increases, incorporates an increasing or decreasing width (B).

10. A helical-ribbon mixer according to claim 1, characterized in that it has a filler neck (6) at its top and a clearing arm (51) and controllable outlet (60) at the bottom.

11. A helical-ribbon mixer according to claim 1, characterized in that at least two mixing vessels (1A, 1B), each having one mixer (1C, 1D), are disposed with parallel axes, contacting one another or slightly penetrating into one another with partially or fully opened mixer walls (2A, 2B) in that region, creating a communicating region (24).

12. A helical-ribbon mixer according to claim 11, characterized in that the mixing vessels (1A, 1B) are designed upwardly divergent and communicate with one another in a widest region (22).

13. A helical-ribbon mixer according to claim 11, characterized in that the helical band (4C) of the first mixer (1C) incorporates in a communicating region (24) a radially outward conveying slope so that the material to be mixed passes over into the second mixer (1D).

14. A helical-ribbon mixer according to claim 13, characterized in that the helical ribbon (4B) of the second mixer (1B) either already ends at the communicating region (24) or incorporates a radially inward conveying slope so that the material (M) to be mixed passes through both mixers (1A, 1B), both ascending, as well as falling, and sequentially.

15. A helical-ribbon mixer according to claim 13, characterized in that it has a reversible drive (30) for preparing a paste and kneading.

16. A helical-ribbon mixer according to claim 1, characterized in that the helical ribbon (4C) is sloped radially upward toward the mixing vessel wall (20, 21) at least where the adjoining mixing vessel wall (20, 21) extends divergently or vertically upward.

17. A helical-ribbon mixer according to claim 1, characterized in that the helical ribbon (4F) incorporates along its lower edge a steeply downward facing screw web (4S).

18. A helical-ribbon mixer according to claim 1, characterized in that it has a heated double-mixer wall (2D).

* * * * *